(12) United States Patent
Freire et al.

(10) Patent No.: US 10,804,829 B2
(45) Date of Patent: Oct. 13, 2020

(54) ASSESSING WIND TURBINE GENERATOR ROTOR TEMPERATURE

(71) Applicant: Siemens Gamesa Renewable Energy A/S, Brande (DK)

(72) Inventors: Nuno Miguel Amaral Freire, Brande (DK); Zhan-Yuan Wu, Sheffield (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/519,218

(22) Filed: Jul. 23, 2019

(65) Prior Publication Data
US 2020/0036311 A1 Jan. 30, 2020

(30) Foreign Application Priority Data

Jul. 26, 2018 (EP) .................................... 18185883

(51) Int. Cl.
*H02P 21/00* (2016.01)
*H02P 21/16* (2016.01)
(Continued)

(52) U.S. Cl.
CPC ............ *H02P 21/0017* (2013.01); *F03D 9/22* (2016.05); *F03D 9/25* (2016.05); *F03D 80/82* (2016.05);
(Continued)

(58) Field of Classification Search
CPC ...... H02P 21/0017; H02P 21/16; H02P 21/22; H02P 21/141; H02P 2101/15; F03D 9/22; F03D 9/25
(Continued)

(56) References Cited

U.S. PATENT DOCUMENTS 2,446,579 A * 8/1948 Fritzinger .............. G01R 27/12
324/149
3,715,926 A * 2/1973 Hendrick ................ G01L 13/02
73/387
(Continued)

FOREIGN PATENT DOCUMENTS

DE 10254295 6/2004
DE 10254295 A1 6/2004
(Continued)

OTHER PUBLICATIONS

European Search Report dated Dec. 4, 2018 for European Application No. 18 185 883.8.
(Continued)

*Primary Examiner* — Pedro J Cuevas
(74) *Attorney, Agent, or Firm* — Schmeiser, Olsen & Watts LLP

(57) ABSTRACT

Provided is a method of assessing rotor temperature during operation of a permanent magnet synchronous machine, including a stator having at least one winding set, the method including: providing reference flux linkage values for different rotor and stator temperature values and current values of an operating winding set; measuring an actual rotor temperature value; measuring an actual stator temperature value; measuring an actual current value of an operating winding set; deriving and storing reference flux linkage values for a given set of operating conditions, in particular, by means of a reference run; deriving a reference flux linkage value (for the measured actual rotor and stator temperature values and the measured actual current value of the operating winding set) using the flux model; obtaining a voltage value; deriving an estimated flux linkage value; deriving a rotor temperature offset; and assessing the rotor temperature based on the rotor temperature offset.

15 Claims, 5 Drawing Sheets

(51) Int. Cl.
*H02P 21/22* (2016.01)
*F03D 9/22* (2016.01)
*F03D 9/25* (2016.01)
*F03D 80/80* (2016.01)
*H02P 21/14* (2016.01)
*H02P 101/15* (2016.01)

(52) U.S. Cl.
CPC ............ *H02P 21/141* (2013.01); *H02P 21/16* (2016.02); *H02P 21/22* (2016.02); *F05D 2220/768* (2013.01); *F05D 2240/91* (2013.01); *F05D 2260/81* (2013.01); *H02P 2101/15* (2015.01)

(58) Field of Classification Search
USPC ...................................................... 290/44, 55
See application file for complete search history.

(56) References Cited

U.S. PATENT DOCUMENTS

| | | | | |
|---|---|---|---|---|
| 5,059,884 | A * | 10/1991 | Shah | H02K 21/44 310/155 |
| 8,421,255 | B2 * | 4/2013 | Jansen | G01K 7/42 290/44 |
| 9,383,265 | B2 * | 7/2016 | Dib | H02P 21/141 |
| 9,570,913 | B2 * | 2/2017 | Andresen | H02P 9/14 |
| 9,577,544 | B2 * | 2/2017 | Petersen | H02M 7/08 |
| 9,577,560 | B2 * | 2/2017 | Kobayashi | H02P 29/64 |
| 10,100,811 | B2 * | 10/2018 | Deng | F03D 7/0296 |
| 10,256,758 | B2 * | 4/2019 | Frampton | H02K 3/26 |
| 10,374,538 | B2 * | 8/2019 | Freire | H02J 3/01 |
| 10,389,284 | B2 * | 8/2019 | Freire | H02P 9/105 |
| 10,521,519 | B2 * | 12/2019 | Tang | H02P 21/141 |
| 10,658,961 | B2 * | 5/2020 | Ottewill | H02P 21/16 |
| 2006/0238172 | A1 * | 10/2006 | Maehara | H02P 9/006 322/33 |
| 2010/0276929 | A1 | 11/2010 | Jansen | |
| 2011/0140424 | A1 * | 6/2011 | Edenfeld | H02P 9/006 290/44 |
| 2015/0137720 | A1 * | 5/2015 | Kobayashi | H02P 29/64 318/400.15 |
| 2015/0311719 | A1 * | 10/2015 | Andresen | H02P 25/22 307/82 |
| 2015/0349655 | A1 * | 12/2015 | Petersen | H02M 7/08 363/35 |
| 2016/0261217 | A1 * | 9/2016 | Tang | H02P 21/22 |
| 2016/0290320 | A1 * | 10/2016 | Deng | F03D 7/0296 |
| 2017/0279391 | A1 * | 9/2017 | Freire | H02P 9/105 |
| 2018/0131302 | A1 * | 5/2018 | Frampton | H02P 9/00 |
| 2018/0241332 | A1 * | 8/2018 | Ottewill | H02P 21/18 |
| 2019/0137568 | A1 * | 5/2019 | Freire | H02P 9/006 |
| 2019/0140571 | A1 * | 5/2019 | Freire | H02M 1/12 |
| 2019/0173413 | A1 * | 6/2019 | Lian | H02P 29/64 |
| 2019/0190418 | A1 * | 6/2019 | Frampton | H02P 9/48 |
| 2019/0229665 | A1 * | 7/2019 | Kobayashi | H02P 21/141 |
| 2019/0229672 | A1 * | 7/2019 | Wiedmann | H02P 29/64 |
| 2019/0238077 | A1 * | 8/2019 | Azar | H02P 21/05 |
| 2019/0273457 | A1 * | 9/2019 | Deng | H02P 21/141 |
| 2020/0036311 | A1 * | 1/2020 | Freire | H02P 29/662 |

FOREIGN PATENT DOCUMENTS

| | | |
|---|---|---|
| EP | 3258594 | 12/2017 |
| EP | 3258594 A1 | 12/2017 |

OTHER PUBLICATIONS

European Search Report dated Dec. 4, 2018 for Application No. 18 185 883.8.

* cited by examiner

ASSESSING WIND TURBINE GENERATOR ROTOR TEMPERATURE

CROSS-REFERENCE TO RELATED APPLICATION

This application claims priority to European Application No. 18185883.8, having a filing date of Jul. 26, 2018, the entire contents of which are hereby incorporated by reference.

FIELD OF TECHNOLOGY

The following relates to a method and an arrangement of assessing generator rotor temperature, in particular permanent magnet temperature, during operation of a permanent magnet synchronous machine, in particular a multiple winding set machine, comprising a stator having at least one winding set. Furthermore, the following relates to a wind turbine or a wind park including the arrangement.

In particular, the following relates to a temperature estimation method intended for determining the rotor temperature of a permanent magnet synchronous machine under operation. More specifically, the method is well suited for fault-tolerant operating modes in which the actual rotor temperature is unknown, such as operation with a reduced number of phases/stator in multi-phase/stator machines or operation with a faulty temperature sensor.

BACKGROUND

Critical machines such as large permanent magnet (PM) generators employed in wind turbines typically include temperature sensors in their stator and rotor, such are required for protection as well as for optimal hardware exploitation. In PM generators, maximum magnet temperature must not be exceeded in order to avoid irreversible demagnetization. Moreover, maximum magnet temperature is closely related to the magnet material composition (percentage of heavy rare earths) and, consequently, magnet cost. Therefore, the generator may have to operate close to the temperature limit, relying on the control system to avoid exceeding it. This is achievable by means of a reliable rotor temperature measurement or estimate, which is used as input of the control/protection method implemented to keep rotor temperature below the maximum allowed design value. The control/protection method eventually could force power derating to protect the generator rotor from over-heating.

Currently, wind turbines may rely solely on a rotor/magnet temperature sensor in order to protect the magnet and maximize power production, whose signal is transmitted to the nacelle by means of slip-rings. Taking this into account, various issues may arise when fault-tolerant operation is to be considered.

Firstly, a failure of the temperature sensor or signal transmitting/conditioning system may force the turbine to stop. Such scenario is traditionally overcome by implementing multiple sensors, which may increase the cost of the measurement drastically, making it unattractive or even unfeasible. Therefore, it is desirable to implement an estimation method with the ability to replace the signal of a faulty sensor and ensure continuous operation, thus enhanced fault tolerant capability.

Secondly, under specific operating conditions, a large PM generator with a rotor (axial) length of several meters may show a non-uniform magnet temperature distribution over the rotor length. Consequently, the rotor temperature measured at a single location may not correspond to the hot-test rotor spot and therefore the magnets are not fully protected. Examples of this can be: (1) a faulty cooling system, leading to a localized temperature rise; and (2) post-fault operation of a multi-phase/stator generator with a reduced number of phases/stators, which usually means operation with increased levels of harmonics/unbalance and may lead to increased rotor losses—due to hysteresis and Eddy-current losses—and non-uniform rotor temperature distribution. The latter may be a major when in reduced converter operation (RCO) in which not all winding set of the stator are operating, requiring an adequate and specifically designed thermal management strategy to overcome the lack of accuracy in measuring rotor temperature.

It has been observed that conventional methods and arrangements for determining or assessing rotor temperature, in particular temperature of permanent magnets mounted at a rotor or comprised in a rotor, does not in all circumstances or operating conditions lead to reliable and satisfactory results, in particular regarding accuracy. In particular, it has been observed that temperatures determined using conventional methods, in particular temperature of permanent magnets of a permanent magnet synchronous machine, are not under all circumstances accurate, in particular if the synchronous machine comprises two or more winding sets, wherein at least one winding set is faulty, thus non-operating.

Concerning operation with a reduced number of stators (so-called reduced converter operation—RCO), the issue is conventionally tackled by adding a constant positive offset to the measured rotor temperature used by the control system for magnet protection. Obviously, this is a simple but very conservative and under-optimal approach, which may lead to significant power production losses, and may not be adequate to protect the magnets from over-heating. Alternatively, the offset may be scheduled according to the operating conditions or the temperature may be estimated with basis on a thermal model. However, these methods tend to be inaccurate and conservative, or need a lot of effort to develop. For example, thermal model based methods usually require a large amount of experimental data under controlled conditions for parameter tuning.

Thus, there may be a need for a method and arrangement of assessing rotor temperature, in particular permanent magnet temperature of a permanent magnet synchronous machine, wherein the accuracy of the temperature determination is improved and/or in which integrity or reliability of a temperature sensor installed at the rotor may be assessed.

SUMMARY

A temperature estimation method based on measured electrical quantities is proposed here, enabling to determine the actual average rotor temperature. Additionally, provided that the fault-tolerant operating mode is known or detected during operation, the difference between measured and estimated temperatures may be further exploited in order to estimate the rotor hotspot temperature. Then, the estimated rotor hotspot temperature may be used as input of the related control/protection methods to achieve an optimized thermal management strategy, whilst to allow the maximum power production. This is not possible by means of the temperature sensor due to the physical limitation of installation.

Embodiments of the present invention may include an identification process for determination of reference values, three temperature estimation methods that can be selected based on the operating modes and available measurements, sensor fault detection, and generator fault tolerant operation at sensor or converter fault. The implementation of the technique is simple, and has been tested effective and robust.

The proposed estimation method may allow continuous operation at sensor fault and with no need for extra redundant sensors.

According to embodiments of the present invention it is provided a method of assessing rotor temperature during operation of a permanent magnet synchronous machine, in particular multiple winding set machine, comprising a stator having at least one winding set, in particular multiple winding sets, the method comprising: providing as a flux model temperature dependent reference flux linkage values (e.g. $\Psi^*(T1 pm,Is)$) for different rotor temperature values (e.g. T1pm) and multiple current values (e.g. Is) of an operating winding set and in particular different stator temperature values; measuring an actual rotor temperature value; measuring an actual current value of an operating winding set; deriving a reference flux linkage value (e.g. $\Psi^*$) for the measured actual rotor temperature value, the measured stator temperature value, and the measured actual current value of the operating winding set using the flux model; obtaining a voltage value related to at least one winding set (e.g. measured for the non-operating winding set; or reference value for an operating winding set); deriving an estimated flux linkage value ($\Psi^\wedge$) based on the obtained voltage value (e.g. associated to T1pm and Is); deriving a rotor temperature offset based on the difference between the reference flux linkage value for the measured actual rotor temperature value and the estimated flux linkage value; and assessing the rotor temperature based on the rotor temperature offset.

The method may further include: providing rotor temperature estimation for machine operation in DCO and RCO modes; and/or providing rotor temperature estimation in DCO operation with or without a rotor temperature sensor; and/or providing a reference run (ID run) for DCO and RCO operations.

The generator rotor temperature may in particular relate to a temperature of permanent magnets of the synchronous machine, the rotor (at which the permanent magnets are mounted) being rotatably supported relative to the stator having the at least one winding set. The assessing of the rotor temperature may in particular involve to determine a maximum rotor temperature based on a comparison of magnetic fluxes derived in two different manners. Assessing the rotor temperature may additionally or alternatively also involve to judge on integrity or reliability of a temperature sensor installed at the rotor. During operation of the permanent magnet synchronous machine the rotor rotates relative to the stator. The stator may comprise at least one winding set or two winding sets or even more winding sets. If the stator comprises multiple winding sets, one or more of the winding sets may be non-operable, for example due to a converter fault or other. However, one or more winding sets may still remain operating. Each winding set may comprise multiple wires, for example three wires for providing three phases. The wires of one winding set may for example be connected in a star configuration or in any other connection configuration.

The temperature-dependent reference flux linkage values are provided based on the flux model, wherein the flux model may for example be represented by a mathematical equation relating the temperature-dependent reference flux linkage values for a particular rotor temperature (and in particular for different current values of the one or more operating winding sets and/or for one or more stator temperatures) to reference flux linkage values being associated to a (single) reference rotor temperature and a factor comprising a measured rotor temperature. The flux model may be represented by a mathematical equation, the flux values may be represented by a look-up table or any data structure relating flux linkage values to different temperatures and at least different current values of at least one operating winding set.

The actual rotor temperature value may be measured by a temperature sensor installed at the rotor. Thus, the method may, differently from conventionally proposed methods, take advantage or may rely on a measurement of the rotor temperature using a temperature sensor. However, the temperature sensor may be damaged or deteriorated such that the measurement value of the rotor temperature may not be reliable or may be inaccurate. The method is for example also applicable to identify a temperature sensor failure or temperature sensor problem.

The actual current value(s) (e.g. including d-component and q-component) of the operating winding set may for example involve measuring the currents of all windings or all wires of one winding set which is still operating. All operating winding sets may be connected to a respective converter. The operating winding sets may work independently from each other and may independently provide power output during normal operation. Measuring the current value of the operating winding set together with obtaining a voltage value related to at least one winding set may enable to derive the (reference) flux linkage value.

The flux model may make use of experimental results obtained for example in a reference run previously performed. The flux model may comprise model parameters which may have been determined previously or are known beforehand. These model parameters may define or describe how the magnetic flux linkage changes with changing temperature of the permanent magnets and/or temperature of the stator.

The voltage value obtained may for example be a voltage measured at a non-operating winding set or may for example be a reference voltage of an operating winding set which is typically supplied to a converter connected to the operating winding set. Based on the voltage measurement or voltage reference value, the estimated flux linkage value is derived. Thereby, the reference flux linkage value as well as the estimated flux linkage value are obtained using different methodologies. Ideally, if the temperature sensor installed at the rotor works properly, these two differently derived flux linkage values should be equal. However, if the reference flux linkage value and the estimated flux linkage value are different, it may indicate that there is a problem with the temperature sensor or it may indicate that there is an uneven distribution of temperature across the rotor, in particular in the case where at least one winding set is non-operating. In this operational condition it is expected that there may be a maximum rotor temperature (also referred to as hotspot temperature) which may be different from the temperature which has been measured by the temperature sensor installed at the rotor. The method is capable of identifying either a malfunction of the temperature sensor and/or an uneven distribution of temperature values across the rotor. Thus, the rotor temperature characteristics, in particular in terms of uneven or even distribution and/or reliability may be assessed based on the derived rotor temperature offset.

A rotor temperature sensor failure may be inferred based on the rotor temperature offset. In particular, if the difference between the reference flux linkage value and the estimated flux linkage value is larger than a threshold, it may be inferred that a rotor temperature sensor failure is present. Alternatively or additionally, based on the rotor temperature offset, a maximum rotor temperature value may be inferred. In particular, the maximum temperature value may be obtained as a sum of the measured temperature value of the permanent magnets and the offset multiplied by a gain factor which may be adapted based on the operating condition. The gain may for example be one or two according to particular embodiments.

According to embodiments of the present invention, the temperature dependent reference flux linkage values have been obtained previously during a reference run (also referred to as ID run below), including: measuring a, in particular single, reference rotor temperature (e.g. T0pm); measuring a, in particular single, stator rotor temperature (e.g. T0stator); obtaining electrical parameter values associated to the reference rotor temperature, the electrical parameter values including the multiple current values (Is) of the operating winding set and the voltage (e.g. Uoc in eq.(4), Uq in eq.(10)) related to the at least one winding set; calculating reference flux linkage values (e.g. $\Psi^*$(T0pm,Is)) based on the obtained electrical parameter values, the reference flux linkage values being associated to the reference rotor and stator temperature and the electrical parameter values; establishing the flux model providing the temperature dependent reference flux linkage values (e.g. $\Psi^*$(T1pm,Is)) for the different rotor temperature values (e.g. T1pm) and current values (e.g. Is) of the operating winding set based on: the reference flux linkage values (e.g. $\Psi^*$(T0pm,Is)) associated to the reference rotor and stator temperatures (e.g. T0pm and T0stator) and to the multiple current values of the operating winding set, and model parameter values (e.g. CT, CA, KA from eq. (6)).

As an example, during the reference run, the reference flux values are obtained for given constant rotor temperature (T0pm) and stator temperature (T0stator), whereas the stator current (e.g. Is) is varied, thus, $\Psi^*$(T0pm,T0stator,Is).

The permanent magnet flux may have been given by the manufacturer for a single so-called reference temperature, and accordingly the conventional temperature dependent flux model employed to estimate temperature. However, this permanent magnet flux may be inaccurate for several reasons as will be detailed below. Thus, performing the reference run for actually measuring the electrical parameter values including the multiple current values of the operating winding set and the voltage related to at least one winding set may enable to actually experimentally obtain the reference flux linkage values for different combinations of current values for the reference rotor temperature. Thereby, particularities of the actually used synchronous machines may be taken into account, in particular allowing to more accurately determine the permanent magnet flux or flux linkage.

Once the reference flux linkage values (for the reference rotor temperature and different current values) are obtained, the temperature dependency may be derived by the flux model comprising the model parameter values, essentially defining the temperature dependency. In particular, the flux model may be given by a mathematical equation where the temperature dependent reference flux linkage values are given by a product of the reference flux linkage value for the reference rotor temperature and an expression comprising the model parameter values and at least the measured rotor temperature.

According to embodiments of the present invention, the electrical parameter values comprise measured and/or reference electrical parameter values, related to voltage of a non-operating or operating winding set.

Thereby, different operating conditions of the permanent magnet synchronous machine may be supported, namely a condition in which all winding sets are operating and a condition in which at least one winding set is non-operating.

According to embodiments of the present invention, obtaining the estimated flux linkage value comprises, while at least one winding set is non-operational (RCO): measuring at least one voltage value of a non-operating winding set; determining the estimated flux linkage value based on the measured voltage value (e.g according to eq.(5)).

This embodiment is described further below as a first method.

Furthermore, for determining the estimated flux linkage value, also the current value or current values of the operating winding set may be taken into account.

According to embodiments of the present invention, obtaining the estimated flux linkage value comprises, while at least one winding set is non-operational (RCO): measuring at least one actual current value of the operating winding set; obtaining at least one voltage reference value supplied to a converter connected to the operating winding set; determining the estimated flux linkage value based on the measured actual current value and the voltage reference value (e.g. according to eq.(10)).

This embodiment is described further below as a second method.

Thus, the method supports the assessing of the rotor temperature in case of a reduced converter operation (RCO) in which at least one winding set is non-operational or non-operating. In particular, in this situation, it is expected that an uneven temperature distribution prevails across the rotor. In particular, in an axial center of the rotor, a maximum temperature is expected. This maximum temperature may be determined using embodiments of the present invention.

According to embodiments of the present invention, obtaining the estimated flux linkage value comprises, while all winding sets are operational (DCO): measuring at least one actual current value of one of the operating winding sets; obtaining at least one voltage reference value supplied to a converter connected to the one operating winding set; determining the estimated flux linkage value based on the measured actual current value and the voltage reference value (e.g. according to eq.(10)).

This embodiment is also described in more detail further below as a third method.

In this method, no winding set of a multiple winding set or a single winding set synchronous machine is non-operating, but all winding sets are operating. If more than one winding set is operating, the actual current value may be obtained by either one of the operating winding sets or may be obtained as a combination, such as an average of current values obtained from both or of all operating winding sets. The operational mode in which all winding sets are operating is also referred to as dual converter operation (DCO) in the following—particular case of a dual winding machine.

According to embodiments of the present invention, the reference flux linkage values associated to the reference rotor temperature and the electrical parameter values are stored in a look-up-table or a curve fit is performed. Any data structure or representation may be utilized for making available the reference flux linkage value or save these values in association with the relevant other quantities.

According to embodiments of the present invention, the actual rotor temperature value is measured by a temperature sensor installed at an axial end of the rotor. Thus, conventionally installed temperature sensors may be supported by the method.

According to embodiments of the present invention, obtaining the voltage value related to at least one winding set comprises: measuring voltage for the non-operating winding set; or using a reference voltage value for an operating winding set, the reference voltage value in particular being supplied to a converter connected to the operating winding set.

The voltage may relate for example to an average of amplitudes of voltages measured or observed at all phases. The current value may relate to the d-component and/or the q-component or a combination of the d-component or the q-component of currents of the considered winding set.

The stator may have exactly two winding sets. In other embodiments, the stator may have only one winding set or more than two winding sets.

According to embodiments of the present invention, the permanent magnet synchronous machine is a generator, in particular of a wind turbine.

It should be understood, that features, individually or in any combination, disclosed, explained or described in the context of a method of assessing rotor temperature during operation of a permanent magnet synchronous machine may also be applied, individually or in any combination, to an arrangement for assessing rotor temperature during operation of a permanent magnet synchronous machine according to embodiments of the present invention and vice versa.

According to embodiments of the present invention it is provided an arrangement for assessing rotor temperature during operation of a permanent magnet synchronous machine, in particular multiple winding set machine, comprising a stator having at least one winding set, in particular multiple winding sets, the arrangement being adapted to control or carry out a method according to one of the preceding embodiments.

Furthermore, a wind turbine and a wind park is provided, which includes an arrangement according to the above described embodiments.

BRIEF DESCRIPTION

Some of the embodiments will be described in detail, with references to the following Figure, wherein like designations denote like members, wherein:

FIG. 1 schematically illustrates a wind turbine an arrangement for assessing rotor temperature according to an embodiment of the present invention;

FIG. 2 schematically illustrates a generator side controller of a frequency converter as may be included in the wind turbine illustrated in FIG. 1;

DETAILED DESCRIPTION

Figure 1:
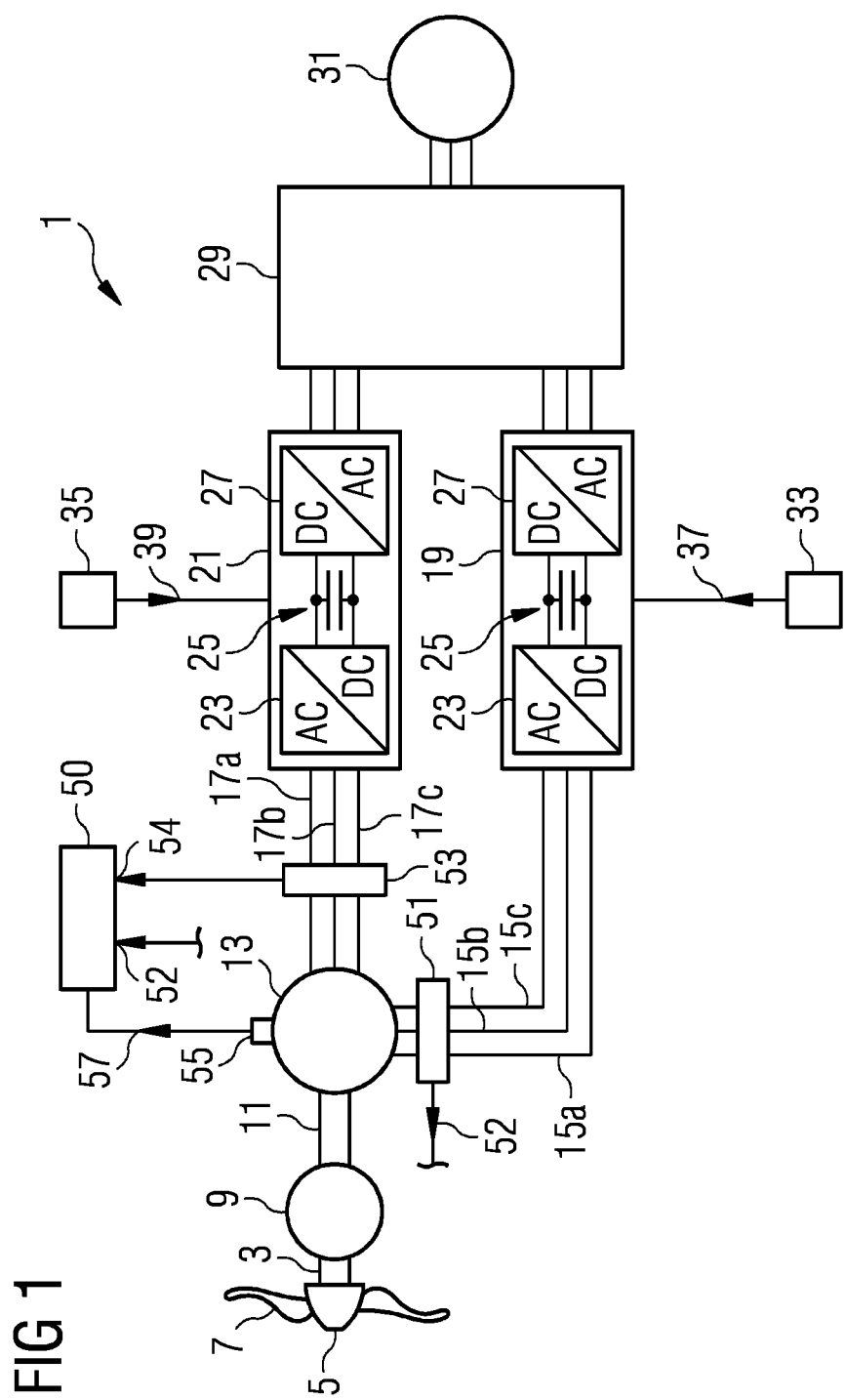

The wind turbine 1 schematically illustrated in FIG. 1 comprises a rotation shaft 3 having a hub 5 at which plural rotor blades 7 are connected. The rotation shaft 3 is coupled to an optional gearbox 9 to which a secondary shaft 11 is coupled which is mechanically driving the generator 13 being an example of a synchronous permanent magnet synchronous machine having two independent winding sets. In particular, the generator 13 has a first winding set 15 comprising wires 15a, 15b, 15c and a second winding set 17 comprising wires 17a, 17b, 17c. The wires 15a, 15b, 15c are also referred to as first winding set 15. The wires 17a, 17b, 17c are also referred to as second winding set 17.

Each of the winding sets 15, 17 is connected to a respective converter 19, 21 each comprising a generator side section 23, a DC link 25 and a grid side portion 27. The generator side portion 23 may in particular comprise an AC-DC converter comprising plural controllable switches controlled by pulse width modulating signals, for example. The output terminals of both converters 19, 21 are connected to primary coils of a transformer 29 which transforms the output voltage to a higher voltage to be connected or supplied to a utility grid 31.

Each of the converters 19, 21 comprises a respective converter controller 33, 35, respectively, which provides control signals 37, 39, respectively, to the respective converters 19, 21.

The wind turbine further comprises an arrangement 50 (which can be implemented in a turbine controller) for assessing rotor temperature during operation of the permanent magnet synchronous machine 13 according to embodiments of the present invention which will be described in detail with respect to the FIGS. 3, 4 and 5 below. Using measurement equipment 51, 53 the arrangement receives measurement values of current and/or voltage of the first winding 15 and/or the second winding 17 by receiving measurement signals 52, 54, respectively. Furthermore, the generator 13 comprises at least one temperature sensor 55 installed at a rotor having permanent magnets, wherein the temperature sensor 55 supplies a rotor temperature measurement value 57 to the arrangement 50. The generator 13 comprises at least one stator temperature sensor also supplying stator temperature measurement value to the arrangement 50.

Embodiments of the present invention may support or require that a stator temperature sensor and a rotor temperature sensor are present; that a stator temperature sensor but not rotor temperature sensor is present. According to one of the disclosed ideas, the rotor sensor may not be needed, whereas the stator sensor may be required.

Figure 2:
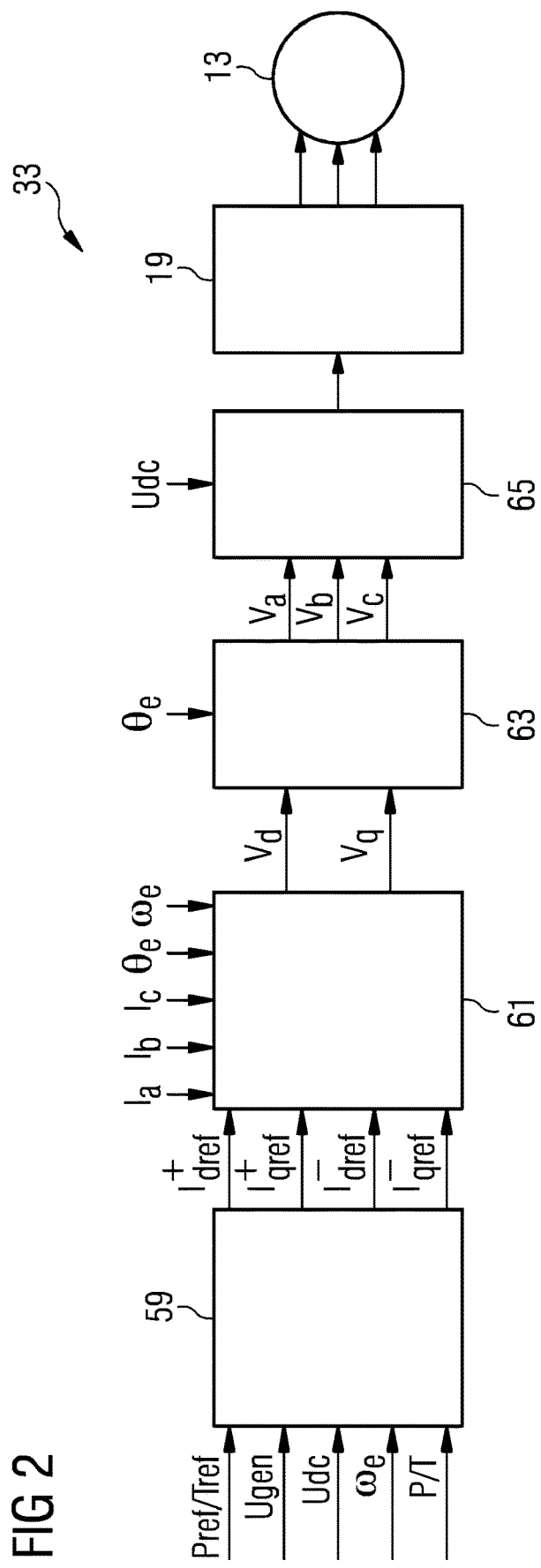

FIG. 2 illustrates a block diagram of an implementation of the converter controller 33 as included in the wind turbine illustrated in FIG. 1 according to embodiments of the present invention. The controller 33 comprises a current reference calculation module 59 which receives power reference and/or torque reference Pref/Tref, generator voltage Ugen, DC link voltage Udc, electrical frequency $\omega_e$ and actual power and/or torque P/T. The current reference calculation module 59 outputs d-component and q-component of reference current of the positive rotating frame and the negative rotating frame and supplies them to a current controller 61 which furthermore receives the current $I_a$, $I_b$, $I_c$ of the respective connected winding set and further the electrical angle $\Theta_e$ and the electrical frequency $\omega_e$. The current controller 61 outputs the d-component and the q-component of the voltage $V_d$, $V_q$ and supplies it to a transformation module 63 which, upon receiving the electrical angle $\Theta_e$, transforms the quantities in the d-q coordinate system to the abc-coordinate system being fixed relative to the stator. The transformation module thus outputs the voltages $V_a$, $V_b$, $V_c$ as voltages in the stator fixed coordinate system and provides these voltages to a modulator 65 which receives the voltage Udc of the DC link 25. The output of the modulator is supplied to the respective converter 19 which is connected to the generator 13.

Figure 3:
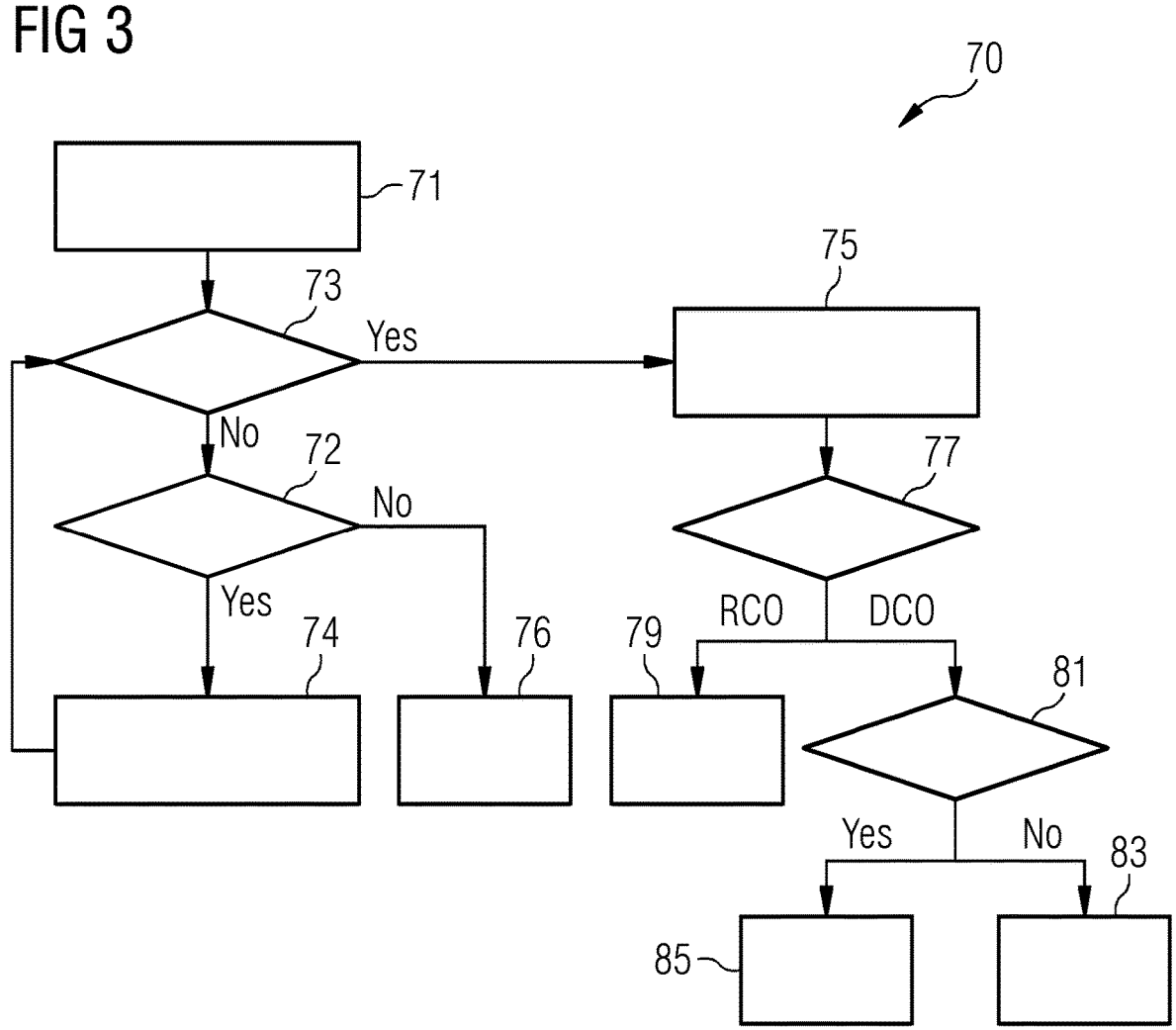
FIG. 3 illustrates a diagram of a method of assessing rotor temperature according to embodiments of the present invention.

FIG. 3 illustrates a method scheme 70 of a method of assessing rotor temperature during operation of a permanent magnet synchronous machine according to embodiments of the present invention. The method illustrated in FIG. 3 may for example be performed by the arrangement 50 or controller 33 or 35 illustrated in FIG. 1.

In a method block 71, turbine operation is started. A decision block 73 assesses whether a reference run (also referred to as identification (ID) run) is complete. If the reference run is complete, the method branches to block 75 in which the rotor temperature is estimated. Therein it is assessed in a decision block 77 in which operation mode, i.e. in a reduced converter operation (RCO) mode or in a dual converter operation mode (DCO) the wind turbine is currently. If the wind turbine is in a reduced converter operation mode, i.e. at least one winding set is non-operating, it is branched to a block 79 in which the wind turbine is run with the estimated temperature offset in the reduced converter operation. If it is decided in the decision block 77 that the wind turbine is in the dual converter operation, it is branched to a further decision element 81 which assesses whether a rotor temperature sensor is present. If no rotor temperature sensor is present, it is branched to a block 83, in which the wind turbine is run with estimated rotor temperature in the dual converter operation. If a rotor temperature sensor is present, it is branched to the method block 85 in which condition monitoring of the temperature sensor is performed, in order to allow fault detection and fault tolerance.

If the reference run is not complete, it is assessed in the decision block 72 whether the conditions for the reference run are met. If this is the case the reference run is performed in block 74. If this is not the case, the method uses a constant temperature offset in block 76.

The implementation of an estimation method may take advantage of the presence of rotor temperature sensors, eventually overcoming many of the issues inherent to conventional estimation methods. Therefore, by exploiting the information given by electrical and temperature measurements, the proposed method may allow the control system to estimate rotor temperature in a simple but relatively accurate manner, without requiring the accurate knowledge of a large amount of parameters and being robust against production tolerances.

A general description of the proposed method when employed to a wind turbine can be given with aid of the flow chart in FIG. 3. Firstly, an identification run (ID run) is required in order to determine reference values at given rotor and stator temperatures. This procedure may be as simple as increasing/decreasing power by steps and saving the values of interest in a look-up-table (called reference magnet flux values throughout this document). For instance, during turbine commissioning, once the control system detects full power operation, power is ramped down in steps. Afterwards, the acquired reference values may be used directly or, alternatively, a fitted curve may be obtained by means of a least square method, and used as input of the rotor temperature estimator block. Moreover, predefined conditions may need to be met in order to successfully carry out the ID run, which may depend on the operating mode that the temperature estimator is aimed for.

Some examples of ID run (e.g. performed in block 74 of FIG. 3) conditions may be: (1) rotor and stator temperatures should not vary more than a given value (e.g.: 2K) over the complete ID run; (2) if in RCO, the ID run is to be carried out immediately after switching from DCO to RCO or after a given time period without producing power in order to ensure even temperature distribution over the rotor—not verifiable by means of available measurements; (3) assuming that airgap variation due to thermal expansion can be neglected in RCO but not in DCO, the temperature difference between stator and rotor temperature should be below a given threshold before starting the ID run in RCO (ID run may not be allowed immediately after transition from DCO to RCO). Additional conditions may be imposed in order to enable an accurate ID run, which is of vital importance for achieving accurate rotor temperature estimation. Here the term DCO is used for operation when all multiple channels in a multiple phase generator are working, for example, a dual channel three-phase generator; RCO refers to the case when partial channels in a multiple phase generator are operating, or reduced converter operation. This definition applies throughout the document.

Furthermore, the conditions imposed for the ID run may allow to remove completely the need for a rotor temperature, which is a potential cost out measure and an improvement in reliability. This can be achieved by carrying out the ID run during the turbine commissioning or after a given time period in stop/idle modes only (typically, several hours), when it can be assumed that both stator and rotor temperatures are the same ("cold machine"). In this condition, the stator temperature sensors provide the rotor temperature too. The compromise of this approach is that the machine is not fully protected before the ID run is completed successfully, which may force a conservative power derating.

In case the ID run has not been carried out, the turbine runs (in block 76 of FIG. 3) in DCO without the ability to detect and replace the signal of a faulty rotor temperature sensor, and in RCO with a constant temperature offset (worst case scenario determined with basis on experiments). Once the ID run is completed, the rotor temperature estimator block may be enabled, endowing the turbine with the fault-tolerant capabilities in DCO and allowing optimal production and protection in RCO.

The details of different possibilities of implementing a rotor temperature estimator are analysed next. A first, a second and a third method are described depending on operating mode and available measurements, all are temperature estimators based on the estimation of permanent magnet flux linkage.

Figure 4:
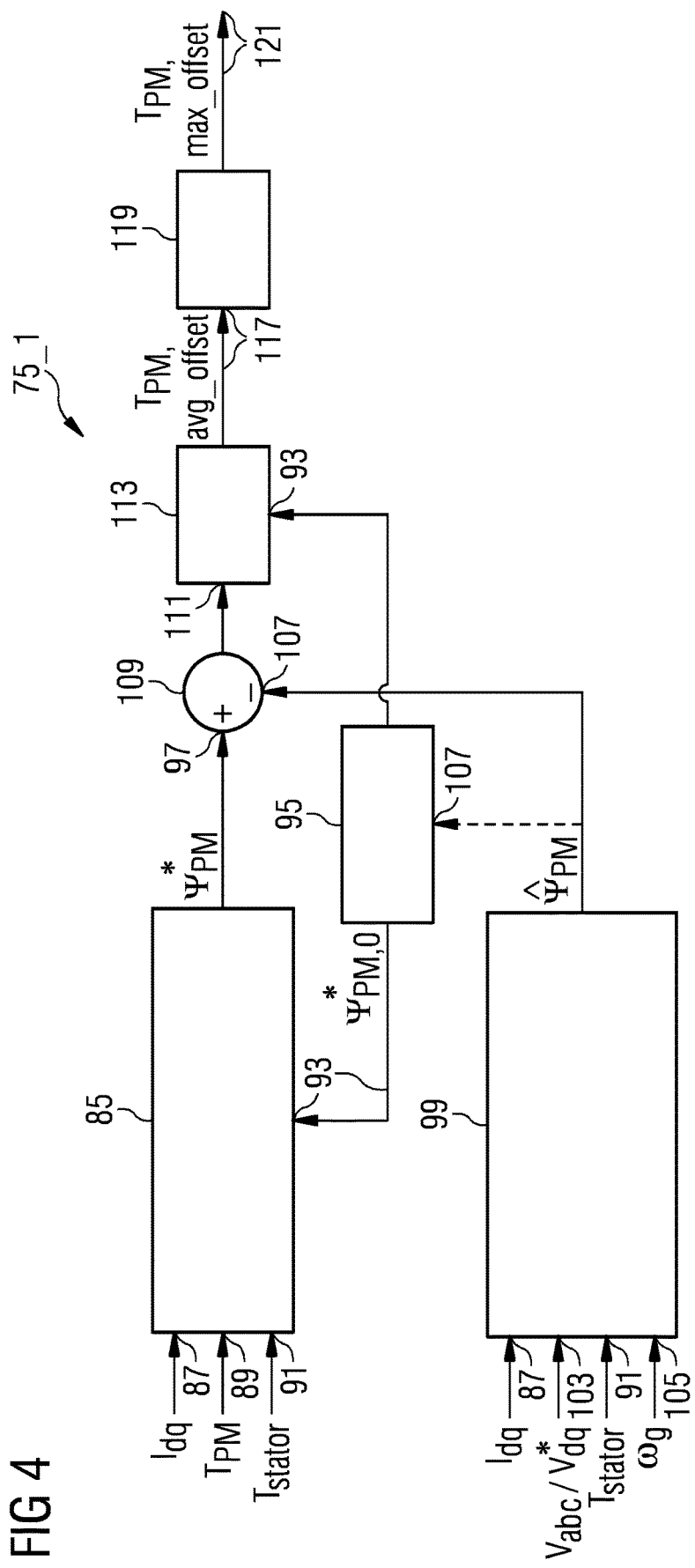
FIG. 4 shows a block diagram of an open loop temperature offset estimator used for the method of FIG. 3 according embodiments of the present invention.
Figure 5:
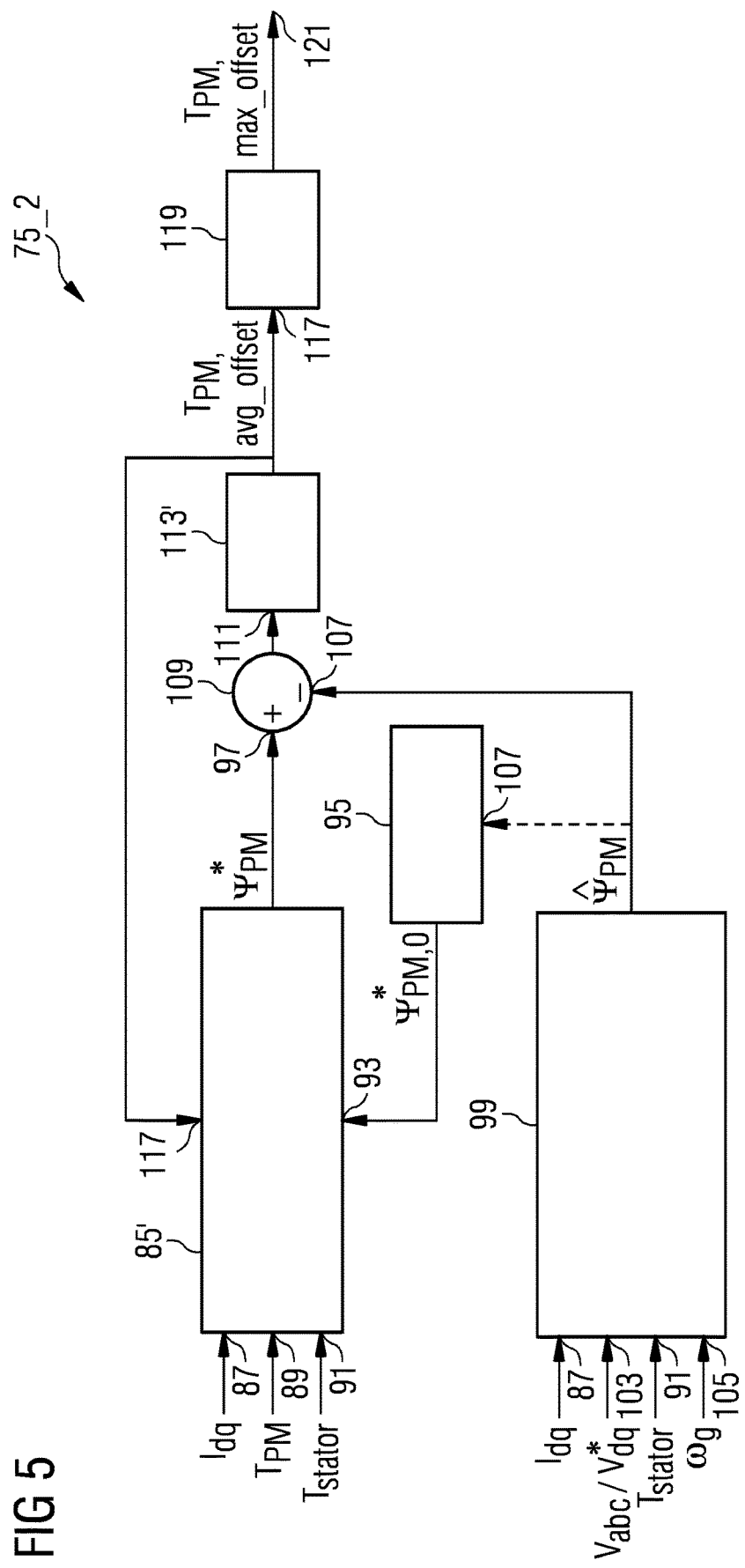
FIG. 5 illustrates a block diagram of a closed loop temperature offset estimator used for the method of FIG. 3 according to embodiments of the present invention.

The rotor temperature estimation (illustrated as block 75 in FIG. 3) may for example be implemented as is illustrated in the method schemes illustrated in FIG. 4 or 5.

In FIG. 4, the open-loop temperature offset estimator implementation is illustrated in a block diagram 75_1. A reference model block 85 receives the current values $I_{dq}$ (reference sign 87) of the operating winding set, receives the measured actual rotor temperature $T_{PM}$ (reference sign 89) and further receives the actual stator temperature $T_{stator}$ (reference sign 91). Furthermore, the reference model block 85 receives the reference flux linkage values 93 being associated to reference rotor and stator temperatures $T0_{PM}$ and $T0_{stator}$ as obtained from a reference run 95 (i.e., ID run). Based on the input values 87, 89, 91, 93, the reference model block 85 calculates temperature dependent reference flux linkage values 97.

The implementation 75_1 of the rotor temperature estimation block 75 in FIG. 3 further comprises a permanent magnet flux estimation module 99 which estimates the permanent magnet flux linkage based on input signals for the current values $I_{dq}$ (reference sign 89 of the operating winding set, for the measured voltage values of a non-operating winding set V$_{abc}$ or reference voltages V*$_{dq}$ of the operating winding set (reference sign 103), for the stator temperature 91 (T$_{stator}$) and for the electrical frequency ω$_g$ (reference sign 105). Based on these input values or signals 89, 103, 91, 105, the permanent magnet flux estimator 99 calculates an estimated flux linkage value 107 which is supplied to a difference element 109 (and, during a reference run, to reference run module 95) to which also the reference flux linkage value 97 for the measured actual rotor temperature value is supplied. The difference between these flux linkage values (difference is labelled with reference sign 111) is supplied to a calculation module 113 which may, based on the difference 111 and the output 93 of the reference run module 95, derive a rotor temperature offset 117. Using a gain and/or filter element 119, a maximal temperature offset 121 may be calculated based on which the maximal rotor temperature may be calculated (for example according to equation (8) given below).

FIG. 5 schematically illustrates a block diagram of another implementation 75_2 of the rotor temperature estimation module 75 illustrated in FIG. 3. Many elements and modules of the implementation 75_2 are similar or the same as in the implementation 75_1 illustrated in FIG. 4. However, the implementation 75_2 is not implemented as an open loop but as a closed loop temperature offset estimator. Therefore, the temperature offset output by the element 113' is fed back to the adaptive reference model element 85' which adapts the reference model taking into account the temperature offset 117. Furthermore, the element 113' illustrated in FIG. 5 does not receive as an input the output 93 of the reference run module 95 as is shown in FIG. 4.

The operating winding set is also referred to as loaded winding set and the non-operating winding set is also referred to as open-circuit winding set. Furthermore, a winding set is also referred to as channel.

Below, the first, the second and the third methods are described in detail.

First Method: Rotor temperature estimation in RCO using voltages measured at the terminals of the winding in open-circuit channel This method may be the simplest and less parameter dependent, but requires the use of voltage sensors, which may be considered as additional hardware. The main advantage may result from the fact that open-circuit voltage is mainly dependent on magnet flux (for the sake of simplicity, back-emf may be considered approximately proportional to magnet flux), and the accurate knowledge of the machine parameters (Rs, Ldq) may not be required. The steady state voltage equations for a winding in open-circuit (e.g., channel 2) are given as below:

$$u_{d,2} = -\omega_e L_{12} i_{q,1} \quad \text{eq.(1)}$$

$$u_{d,2} = -\omega_e L_{12} i_{q,1} + \omega_e \psi_{PM} \quad \text{eq.(2)}$$

It is worth pointing out that the mutual inductance between windings across channels—L12—tends to be much lower than Ldq and consequently smaller errors are expected as a result of L12 uncertainty.

Furthermore, assuming that mutual inductance between windings is independent of temperature (rotor and stator) for a given Idq1 (i.e. a given operating point), the temperature variation may be derived from the corresponding PM flux variation or voltage variation given by:

$$\Delta \psi_{PM} = \frac{u_{q,2}(T0) - u_{q,2}(T1)}{\omega} = \quad \text{eq. (3)}$$
$$\psi_{PM}(T0) + L_{12} i_{d,1} - \psi_{PM}(T1) - L_{12} i_{d,1} = \psi_{PM}(T0) - \psi_{PM}(T1)$$

which is free of machine parameters.

In addition to magnet temperature, PM flux linkage varies with airgap length as a result of thermal expansion. Eventually, this effect may be less significant in RCO as a consequence of operation at reduced power levels and low stator temperatures. However, for the sake of completeness, the compensation of airgap length variation is also taken into account in the theoretical considerations below.

Conventionally, PM flux for a given reference temperature is given by the manufacturer and used as reference value for the estimation. This approach neglects the PM flux linkage dependence on the currents (Idq), which tends to be strongly non-linear for high-power machines, as well as production tolerances (airgap length, PM material, magnet shape, etc), and power converter non-linearity (error between reference and actual voltages). As a consequence, back-emf based estimation may become unfeasible, since the errors are misinterpreted as a temperature variation. In order to overcome this major problem, the controller must carry out an identification run (ID run) also commonly known as automatic commissioning, when the machine is firstly put into RCO, which will allow the controller to learn the actual reference PM flux of the machine under control.

During the ID run, the reference PM flux linkage is then obtained as a function of Idq (or simply stator current: Is=sqrt(Id^2+Iq^2)) for given rotor and stator temperatures (T0pm, T0stator):

$$\psi^*_{PM,0}(T0_{PM}, T0_{stator}, I_s) = \frac{u_{OC}(T0_{PM}, T0_{stator}, I_s)}{\omega_e} \quad \text{eq. (4)}$$

where u_OC stands for the measured open-circuit voltage. The reference flux values may be stored in a simple 1D LUT and used in an additional curve fitting procedure. In case Idq is considered instead of Is, the LUT dimension naturally increases.

During operation (ID run done), PM flux is continuously calculated/estimated and given by:

$$\hat{\psi}_{PM,1}(T1_{PM}, T1_{stator}, I_s) = \frac{u_{OC}(T1_{PM}, T1_{stator}, I_s)}{\omega_e} \quad \text{eq. (5)}$$

where T1pm and T1stator stand for the measured rotor and stator temperature at the instant taken for the flux estimation.

Taking into account the temperature information (T1pm, T1stator) and the reference flux values, a temperature dependent reference flux values can be calculated as follows:

$$\psi^*_{PM,1}(T1_{PM}, T1_{stator}, I_s) = \psi^*_{PM,0}(T0_{PM}, T0_{stator}, I_s)[1+ C_T(T0_{PM}-T1_{PM})+C_A K_A((T0_{stator}-T0_{PM})- (T1_{stator}-T1_{PM}))] \quad \text{eq. (6)}$$

where coefficients CT [Wb/K], CA [Wb/mm], and KA [mm/K] need to be known a priori. These values may be readily available from electromagnetic design and/or obtained by means of experiments. Accordingly, the derived reference magnet flux takes into consideration the influences of current, temperature, and airgap length, but without actually measuring PM flux as in eq. (5).

Therefore, eq. (5) and eq. (6) are identical only if accurate coefficients and temperature values are provided for eq. (6), otherwise they will differ from each other.

In fact, when operating in RCO, there is an increase of rotor losses due to eddy currents, which leads to an uneven temperature distribution over the rotor. As a consequence, the measured rotor temperature T1pm does not correspond to actual average rotor temperature, and $\psi^*_{PM,1}$ and $\hat{\psi}_{PM,1}$ differ from each other. This difference in flux values is then exploited to estimate the difference between measured and actual temperatures. Further manipulation of the estimated temperature difference may allow us to estimate the magnet hotspot temperature and protect the magnets adequately.

Finally, by assuming that difference between $\psi^*_{PM,1}$ and $\hat{\psi}_{PM,1}$ is a result of the inaccurate PM temperature only, the temperature offset between measured magnet temperature (rotor axial end) and the actual average magnet temperature may be estimated as below:

$$T_{PM,avg\_offset} = \frac{\psi^*_{PM,1}(T1_{PM}, T1_{stator}, I_s) - \hat{\psi}_{PM,1}(T1_{PM}, T1_{stator}, I_s)}{\psi^*_{PM,0}(T0_{PM}, T0_{stator}, I_s) \times [C_T - C_A K_A]} \quad \text{eq. (7)}$$

The estimated magnet hotspot temperature is:

$$T_{PM,hotspot} = T1_{PM} + T_{PM,avg\_offset} \times \text{Gain} \quad \text{eq. (8)}$$

where Gain depends on rotor temperature distribution. Assuming even temperature distribution, Gain would be equal to one, which is the case of DCO. However, the problem to be tackled here is exactly the uneven temperature distribution over the rotor, therefore assuming that both axial ends assume identical temperature values and correspond to the lowest temperature (which is in fact the case of the machine under study), Gain is approximated to two (derived from Tavg=(Tmin+Tmax)/2).

It is worth noting that both $\psi^*_{PM,1}$ and $\hat{\psi}_{PM,1}$ are observed from the inactive channel. Alternatively, they may be observed from the active channel as in the second method described next. The observation of magnet flux from distinct channels would not fit this purpose, since PM flux is differently affected by armature reaction and saturation effects.

Concerning the implementation of temperature estimator in eq. (7), it may be done either in open-loop or closed-loop manners. The open-loop approach is the direct implementation of eq. (7) as in FIG. 4. Alternatively, a closed-loop observer may be implemented by following the principles of a model reference adaptive system (MRAS) as in FIG. 5. The controller block 113' in FIG. 5 may be a simple integral compensator providing zero steady state error and filtering, which may be a simpler and more robust option. The adaptation of the reference model in FIG. 5 is achieved by modifying eq. (6) as below:

$$\psi^*_{PM,1}(T1_{PM}, T1_{stator}, I_s) = \psi^*_{PM,0}(T0_{PM}, T0_{stator}, I_s)[1 + C_T(T0_{PM} - T1_{PM} - T_{PM,avg\_offset}) + C_A K_A((T0_{stator} - T0_{PM}) - (T1_{stator} - T1_{PM} - T_{PM,avg\_offset}))] \quad \text{eq. (9)}$$

Second Method—Rotor temperature estimation in RCO using converter reference voltages from the loaded winding Despite the simplicity and parameter independence of the first method described above, its implementation often demands additional voltage sensors. In order to avoid this drawback and enable the implementation of a temperature estimator without requirement for voltage measurements, magnet flux estimation can be achieved by using measured currents and reference voltages available in the converter control system, as below:

$$\psi_{PM}(T_{PM}, T_{stator}) = \frac{u_q}{\omega_e} - R_s(T_{stator})\frac{i_q}{\omega_e} - L_d(T_{PM}, T_{stator})i_d \quad \text{eq. (10)}$$

The disadvantage of using the above equation becomes evident, which is the requirement to know accurately Rs and Ld that are temperature dependent. It is worth reminding that constant and/or current dependent errors in the used Rs and Ld are not of concern, because they are present in both reference and estimated fluxes, disappearing from the calculated flux variation.

Rotor position error could be eventually included in the equation above, since it depends on Lq, which depends on rotor and stator temperatures. However, finite element predictions show that Lq variation with temperature is much smaller than Ld variation (for the studied generator, Lq varies less than 3% over the whole operating range due to temperature/airgap), and therefore position error may be assumed to be temperature independent.

Stator temperature measurement is typical available by means of PT100 place in the stator coils, and therefore compensation of Rs variation is straight forward: Rs=Rs_20*(1+0.0039*(T$_{stator}$−20)), where Rs_20 stands for the stator phase resistance at 20 deg C.

On the other hand, compensation of Ld variation is more complex, since it depends on both stator and rotor temperature, similarly to PM flux. Neglecting Ld variation may introduce significant errors at high levels of Id only, and may be interpreted as an error in Ct and Ca. Therefore, a suitable choice of Ct and Ca at rated operating condition (highest Id) may avoid the need for further compensation. This observation may explain partly the need for Ct and Ca values different from theoretically expected values when Ld variation is neglected. These remarks can be understood in detail by using the equation below:

$$\psi^*_{PM,1}(T1_{PM}, T1_{stator}, I_s) = \psi^*_{PM,0}(T0_{PM}, T0_{stator}, I_s)[1 + (C_T - C_{T,Ld}i_d)(T0_{PM} - T1_{PM}) + (C_A - C_{A,Ld}i_d)K_A((T0_{stator} - T0_{PM}) - (T1_{stator} - T1_{PM}))] \quad \text{eq. (11)}$$

where two extra coefficients appear in comparison to eq. (6) in order to take into account Ld variation: CT,Ld [H/K], CA,Ld [H/mm].

The estimator structure for the second method may be the same as in FIGS. 4 and 5.

Third method—Rotor temperature estimation in normal operation using converter reference voltages from the loaded winding The last method described is indeed simply a different application of the second method, which is here applied to normal operation—even temperature distribution over the generator rotor. Accordingly, the third Method can be employed to detect failures of the rotor temperature sensor and replace the faulty signal. The fault detection is carried out by comparing error between the sensor output and the estimated temperature with a given threshold. Whenever the fault detection threshold is exceeded, the sensor signal is replaced with the estimator output, allowing continuous operation and protection of the generator.

Comparing the implementation of the second and third methods, each requires a dedicated ID run because they are aimed for distinct operating modes, the value of Gain is distinct as pointed out previously (Gain=2 for the second method, Gain=1 for the third method), and coefficients may vary too as result of electromagnetic differences.

Remarks on sensitivity to parameter variation are given next. It is important to evaluate the sensitiveness of a magnet flux (back-emf) based temperature estimator to the required machine parameters, such analysis assesses the feasibility of the approach, aids the selection of one of the above methods, and points out which parameters need to be accurately know.

Taking into account the proposed estimators, errors introduced by rotor and/or stator temperature variations are the only relevant ones. A simple sensitivity study can be carried out using the ratio between estimated and actual flux variation:

$$\frac{\Delta \hat{\psi}_{PM}}{\Delta \psi_{PM}} = -\frac{\Delta L_d}{\Delta \psi_{PM}} I_d - \frac{\Delta R_s}{\Delta \psi_{PM}} \frac{I_q}{\omega} \qquad \text{eq. (12)}$$

Taking the generator under study as an example, both $\Delta R_s$ and $\Delta L_d$ due to temperature variation can contribute to errors of up to 10% each in $\Delta \hat{\psi}_{PM}$. Therefore, it becomes clear from eq. (12) that the generator parameters variation with temperature play an important role on the performance of the estimator.

It is important noting that eq. (12) can be used for the evaluation of conventionally used back-emf observers, for which $\Delta R_s$ and $\Delta L_d$ do not depend on temperature only, but also on the error between actual parameters and parameters used by the estimator. These errors are naturally larger and current dependent, thus justifying the choice of the methods.

Remarks on temperature coefficients are given next. The most important parameters in the proposed temperature estimators are the temperature coefficients that characterize the variation of magnet flux linkage as a function of rotor temperature (CT [Wb/K]) and the difference between stator and rotor temperatures (CAKA [Wb/K]). The latter is divided into two parts CA [Wb/mm] and KA [mm/K] because they may be easier to determine separately, for instance, CA may be obtained from finite element simulations, whereas KA from experiments. CT is typically obtained from finite element simulations or magnet datasheets.

The considered generators show constant temperature coefficients over the complete operating range, easing the implementation of the described temperature estimators.

Experimental Results

All three methods were tested using experimental data from generators employed in wind turbines. Good tracking of the rotor temperature during thermal transient is to be noticed.

Embodiments of the present invention may provide:
A solution for determining the rotor temperature of a permanent magnet synchronous machine under operation.
Fault-tolerant operation, reducing down time and increasing energy production.
Improved protection, by ensuring that permanent magnets' temperature limit is not exceeded.
Optimal hardware exploitation by means of a reliable rotor temperature estimate. The need for conservative limits is removed, and maximum allowable power is produced at any instant.
Increased energy production of Siemens turbines in RCO mode.
Potential cost-out measure by removing extra redundant rotor temperature sensors.
Potential cost-out measure by removing voltage sensors.
Potential cost-out measure by removing the rotor temperature sensor and carrying out the identification run only when stator and rotor temperatures are expected to be the same.
A solution suitable for wind turbines, but also for other applications of permanent magnet machines.

Although the present invention has been disclosed in the form of preferred embodiments and variations thereon, it will be understood that numerous additional modifications and variations could be made thereto without departing from the scope of the invention For the sake of clarity, it is to be understood that the use of "a" or "an" throughout this application does not exclude a plurality, and "comprising" does not exclude other steps or elements.

The invention claimed is:

1. A method of assessing rotor temperature during operation of a permanent magnet synchronous machine, including a stator having at least one winding set, the method comprising:
providing, as a flux model, temperature dependent reference flux linkage values for different rotor temperature values) and multiple current values of an operating winding set;
measuring an actual rotor temperature value;
measuring an actual current value of an operating winding set;
deriving a reference flux linkage value for the measured actual rotor temperature value and stator temperature value and the measured actual current value of the operating winding set using the flux model;
obtaining a voltage value related to at least one winding set;
deriving an estimated flux linkage value based on the obtained voltage value and on current values and/or machine parameters;
deriving a rotor temperature offset based on a difference between the reference flux linkage value for the measured actual rotor temperature value and the estimated flux linkage value; and
assessing the rotor temperature based on the rotor temperature offset.

2. The method according to claim 1, wherein the temperature dependent reference flux linkage values have been obtained previously during a reference run, including:
measuring a reference rotor temperature;
measuring a reference stator temperature;
obtaining electrical parameter values associated to the reference rotor temperature, the electrical parameter values including the multiple current values of the operating winding set and the voltage related to the at least one winding set;
calculating reference flux linkage values based on the obtained electrical parameter values, the reference flux linkage values being associated to the reference rotor and stator temperature and the electrical parameter values;
establishing the flux model providing the temperature dependent reference flux linkage values for the different rotor temperature values and current values of the operating winding set based on:
the reference flux linkage values associated to the reference rotor and stator temperatures and to the multiple current values of the operating winding set, and
model parameter values.

3. The method according to claim 1, wherein the electrical parameter values comprise measured and/or reference electrical parameter values, related to voltage of a non-operating or operating winding set, and measured current values of the operating winding set.

4. The method according to claim 1, further comprising:
inferring a rotor temperature sensor failure based on the rotor temperature offset; and/or
maintaining operation of the machine using a rotor temperature estimated from the rotor temperature offset.

5. The method according to claim 1, further comprising:
inferring a maximum rotor temperature value based on the rotor temperature offset.

6. The method according to claim 1, wherein obtaining the estimated flux linkage value comprises, while at least one winding set is non-operational:
measuring at least one voltage value of a non-operating winding set, and/or measuring rotor temperature, and/or measuring stator temperature), and/or measuring currents on operating winding set; and
determining the estimated flux linkage value based on at least the measured voltage value and/or other measured quantities.

7. The method according to claim 1, wherein obtaining the estimated flux linkage value comprises, while at least one winding set is non-operational:
measuring at least one actual current value of the operating winding set;
obtaining the voltage reference values supplied to a converter connected to the operating winding set; and
determining the estimated flux linkage value based on the measured actual current value, the voltage reference value, and/or machine parameters.

8. The method according to claim 1, wherein obtaining the estimated flux linkage value comprises, while all winding sets are operational:
measuring at least one actual current value of one of the operating winding sets;
obtaining at least one voltage reference value supplied to a converter connected to the one operating winding set; and
determining the estimated flux linkage value based on the measured actual current value and the voltage reference value and/or machine parameters.

9. The method according to claim 1, wherein the reference flux linkage values associated to the reference rotor temperatures and/or stator temperature and the electrical parameter values are stored in a look-up-table or a curve fit is performed, and/or
wherein the actual rotor temperature value is measured by a temperature sensor installed at an axial end of the rotor of the generator.

10. The method according to claim 1, wherein the actual stator temperature value is measured by a temperature sensor, wherein the reference run is performed in a condition, where stator temperature substantially equals rotor temperature after the machine has been stopped for a time interval and temperature has equilibrated, wherein the measured stator temperature is used as rotor temperature for deriving the temperature dependent reference flux linkage values, and/or wherein a rotor temperature sensor is either faulty or not present at all.

11. The method according to claim 1, wherein obtaining the voltage value related to at least one winding set comprises:
measuring voltage for the non-operating winding set; or
using a reference voltage value for an operating winding set, the reference voltage value being supplied to a converter connected to the operating winding set.

12. The method according to claim 1, wherein the stator has exactly two winding sets.

13. The method according to claim 1, wherein the permanent magnet synchronous machine is a generator of a wind turbine.

14. An arrangement for assessing rotor temperature during operation of a permanent magnet synchronous machine, comprising a stator having at least one winding set, the arrangement being configured to implement the method according to claim 1.

15. A wind turbine comprising the arrangement of claim 14.

* * * * *